US012266895B2

(12) United States Patent
Huang et al.

(10) Patent No.: US 12,266,895 B2
(45) Date of Patent: Apr. 1, 2025

(54) ELECTRICAL CONNECTOR

(71) Applicant: Dongguan Luxshare Technologies Co., Ltd., Dongguan (CN)

(72) Inventors: Bin Huang, Dongguan (CN); Rongzhe Guo, Dongguan (CN); Chenhui Zeng, Dongguan (CN)

(73) Assignee: DONGGUAN LUXSHARE TECHNOLOGIES CO., LTD, Dongguan (CN)

( * ) Notice: Subject to any disclaimer, the term of this patent is extended or adjusted under 35 U.S.C. 154(b) by 732 days.

(21) Appl. No.: 17/559,740

(22) Filed: Dec. 22, 2021

(65) Prior Publication Data

US 2022/0302654 A1 Sep. 22, 2022

(30) Foreign Application Priority Data

Mar. 19, 2021 (CN) ........................ 202110298247.6

(51) Int. Cl.

*H01R 13/6587* (2011.01)
*H01R 12/70* (2011.01)
*H01R 12/71* (2011.01)
*H01R 13/6471* (2011.01)

(52) U.S. Cl.

CPC ....... *H01R 13/6587* (2013.01); *H01R 12/707* (2013.01); *H01R 12/716* (2013.01); *H01R 13/6471* (2013.01)

(58) Field of Classification Search

CPC ...... H01R 12/70; H01R 12/71; H01R 12/712; H01R 12/716; H01R 12/7005; H01R 12/7011; H01R 12/707; H01R 13/646; H01R 13/6461; H01R 13/6471; H01R 13/6581; H01R 13/6582; H01R 13/6585; H01R 13/6586; H01R 13/6587

USPC .......................................................... 439/83

See application file for complete search history.

(56) References Cited

U.S. PATENT DOCUMENTS

| | | | | |
|---|---|---|---|---|
| 2021/0328369 A1* | 10/2021 | Wu | .................... | H01R 13/6477 |
| 2022/0302654 A1* | 9/2022 | Huang | ................ | H01R 12/716 |

FOREIGN PATENT DOCUMENTS

| | | |
|---|---|---|
| CN | 102185213 A | 9/2011 |
| CN | 205543508 U | 8/2016 |
| CN | 108258495 A | 7/2018 |
| CN | 108511997 A | 9/2018 |
| CN | 111370887 A | 7/2020 |

OTHER PUBLICATIONS

Chinese Office Action and Search Report for Chinese Application No. 202110298247.6, dated Jul. 26, 2022, with an English translation.

* cited by examiner

*Primary Examiner* — Khiem M Nguyen
(74) *Attorney, Agent, or Firm* — Birch, Stewart, Kolasch & Birch, LLP

(57) ABSTRACT

An electrical connector includes an insulation body, a plurality of terminal groups which are disposed in a rows, and a shielding structure. Each terminal group includes a signal terminal and at least two ground terminals, the signal terminal and the ground terminals are each connected to the insulation body, the signal terminal in the each terminal group is disposed between the two ground terminals in the each terminal group, and the shielding structure is disposed between two adjacent terminal groups.

16 Claims, 4 Drawing Sheets

ELECTRICAL CONNECTOR

CROSS-REFERENCE TO RELATED APPLICATION(S)

This application claims priority to Chinese Patent Application No. 202110298247.6 filed Mar. 19, 2021, the disclosure of which is incorporated herein by reference in its entirety.

TECHNICAL FIELD

The present disclosure relates to the technical field of connectors and in particular to an electrical connector.

BACKGROUND

A radio frequency (RF) connector is an element to implement electrical connection or separation. The RF connector is widely used in the field of communication. Because of its high reliability and great anti-interference ability, the RF connector is very popular among users. However, the existing RF connector can transmit merely one set of RF signals. If a plurality of sets of signals need to be transmitted at the same time, a plurality of RF connectors need to be used. Thus, assembly needs to be performed many times with a complicated process. In addition, large space needs to be occupied, costs are high, and it is very inconvenient to use the existing RF connectors.

SUMMARY

The objective of the present disclosure is to provide an electrical connector which can transmit a plurality of sets of signals simultaneously and save space.

To achieve this objective, the present disclosure adopts solutions described below.

An electrical connector includes an insulation body, a plurality of terminal groups which are disposed in rows, and a shielding structure. Each terminal group among the plurality of terminal groups includes a signal terminal and at least two ground terminals, the signal terminal and the at least two ground terminals are each connected to the insulation body, the signal terminal in the each terminal group is disposed between two ground terminals among the at least two ground terminals in the each terminal group, and the shielding structure is disposed between two adjacent terminal groups among the plurality of terminal groups.

REFERENCE LIST

Figure 1:
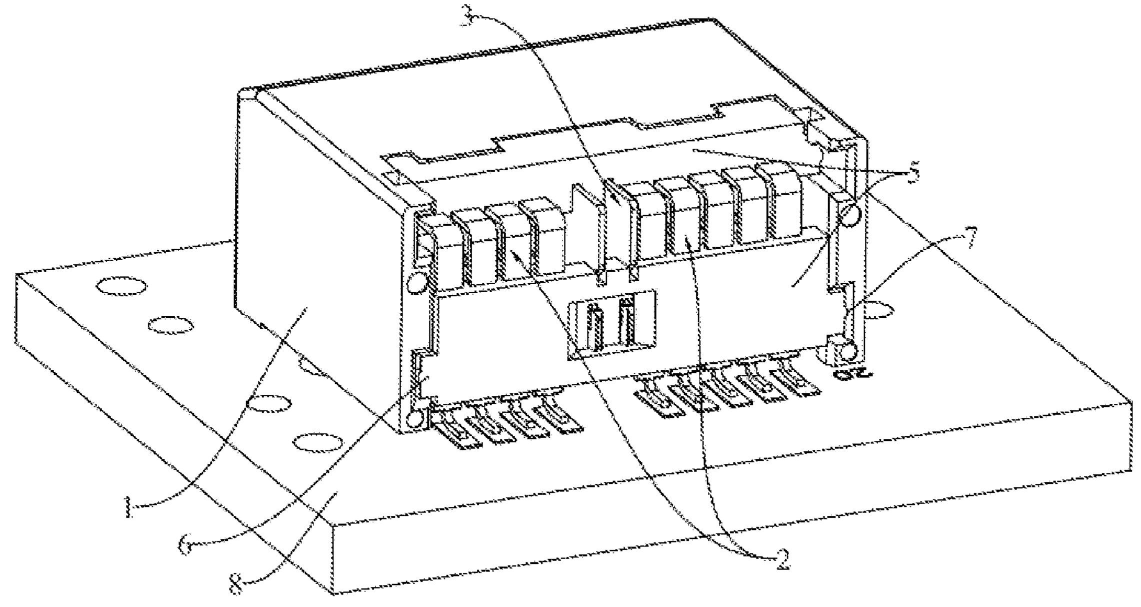
FIG. 1 is a perspective view of an electrical connector according to an embodiment of the present disclosure.

100 PCB
1 insulation body
2 terminal group
2*a* upper row of terminal groups
2*b* lower row of terminal groups
21 signal terminal
22 ground terminal
3 shielding structure
31 first shielding member
311 positioning hole
32 second shielding member
321 shielding sheet
322 spring contact
4 docking interface
5 connection body
51 protrusion
6 engaging protrusion
7 engaging slot
8 substrate

DETAILED DESCRIPTION

The embodiments of the present disclosure are described below in detail. Examples of the embodiments are shown in the drawings. The same or similar reference numerals indicate the same or similar elements or elements having the same or similar functions. The embodiments described below with reference to the drawings are exemplary, are intended to explain the present disclosure and are not to be construed as limiting the present disclosure.

In the description of the present disclosure, it is to be noted that the orientations or position relations indicated by terms such as “center”, “upper”, “lower”, “left”, “right”, “vertical”, “horizontal”, “inside”, “outside”, and the like are based on orientations or position relations shown in the drawings. These orientations or position relations are intended merely to facilitate and simplify description of the present disclosure, and not to indicate or imply that a device or element referred to must have such specific orientations or must be configured or operated in such specific orientations. Therefore, these orientations or position relations are not to be construed as limiting the present disclosure. In addition, terms such as “first” and “second” are used merely for the purpose of description and are not to be construed as indicating or implying relative importance. The terms “first position” and “second position” are two different positions.

Unless otherwise expressly specified and limited, the term “mount”, “connected to each other”, “connected” or “fixed” is to be construed in a broad sense, for example, as fixedly connected or detachably connected; mechanically connected or electrically connected; directly connected to each other or indirectly connected to each other via an intermediary; or internally connected or an interactional relationship between two elements. For those of ordinary skill in the art, specific meanings of the preceding terms in the present disclosure may be understood based on specific situations.

Unless otherwise expressly specified and limited, when a first feature is described as “on” or “below” a second feature, the first feature and the second feature may be in direct contact or be in contact via another feature between the two features instead of being in direct contact. Moreover, when the first feature is described as “on”, “above”, or “over” the second feature, the first feature is right on, above, or over the second feature or the first feature is obliquely on, above, or over the second feature, or the first feature is simply at a higher level than the second feature. When the first feature is described as "under", "below" or "underneath" the second feature, the first feature is right under, below or underneath the second feature or the first feature is obliquely under, below or underneath the second feature, or the first feature is simply at a lower level than the second feature.

Solutions of the present disclosure are further described below through embodiments in conjunction with FIGS. 1 to 6.

Figure 2:
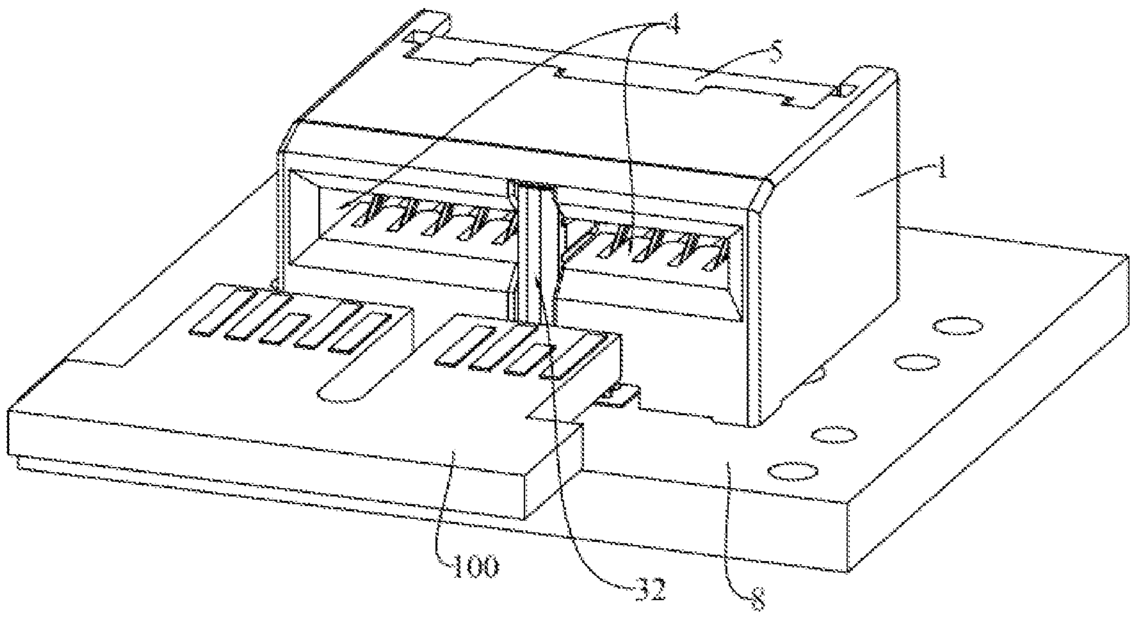
FIG. 2 is a perspective view showing that an electrical connector and a printed circuit board (PCB) are separated according to an embodiment of the present disclosure.
Figure 5:
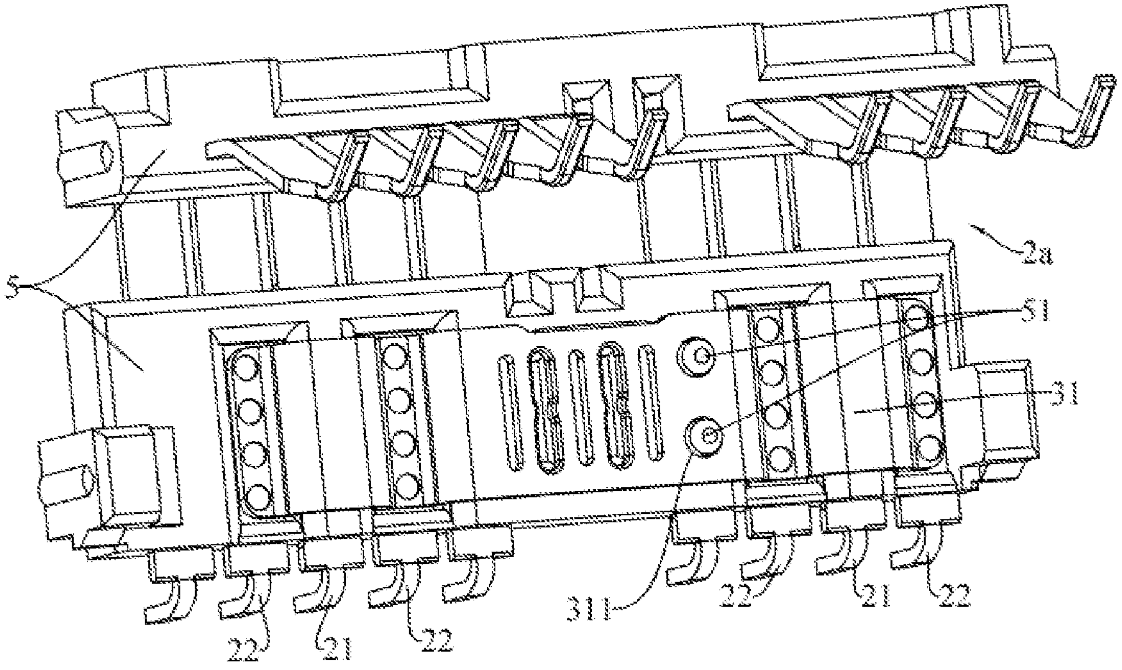
FIG. 5 is a perspective view of an upper row of terminal groups according to an embodiment of the present disclosure.

This embodiment provides an electrical connector. As shown in FIG. 1, FIG. 2, and FIG. 5, the electrical connector includes an insulation body 1, a plurality of terminal groups 2 which are disposed in rows, and a shielding structure 3. Each terminal group 2 includes a signal terminal 21 and at least two ground terminals 22, the signal terminal 21 and the ground terminals 22 are each connected to the insulation body 1, and the signal terminal 21 in each terminal group 2 is disposed between the two ground terminals 22. The shielding structure 3 is disposed between two adjacent terminal groups 2.

In this embodiment, the ground terminals 22 are respectively disposed on two sides of the signal terminal 21 in each terminal group 2 so that mutual interference between adjacent signal terminals 21 can be reduced and radio frequency signals can be transmitted. Each terminal group 2 can transmit one set of signals and a plurality of terminal groups 2 may be disposed and arranged according to needs so that a plurality of sets of signals can be transmitted. In addition, the shielding structure 3 is disposed so that a shielding effect can be further improved and electromagnetic interference can be further reduced.

Further, the electrical connector in this embodiment also includes an iron case (not shown) disposed outside the insulation body 1. The iron case is disposed so that external electromagnetic interference can be shielded and a transmission rate of the electric connector in this embodiment can be improved.

Figure 3:
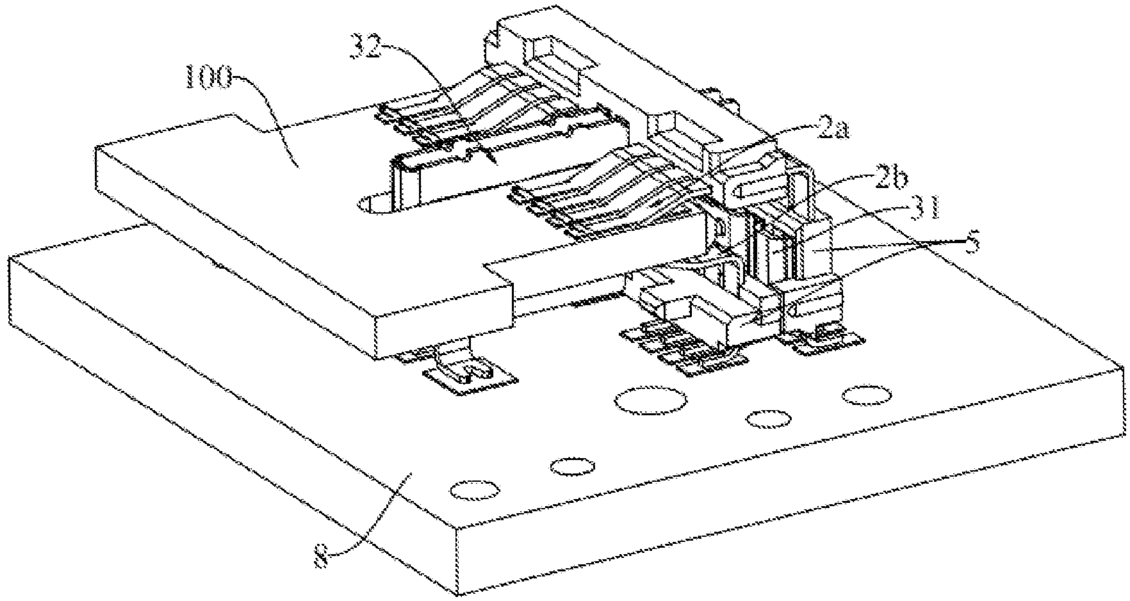
FIG. 3 is a perspective view of an electrical connector with an insulation body removed and from a first viewing angle according to an embodiment of the present disclosure.
Figure 4:
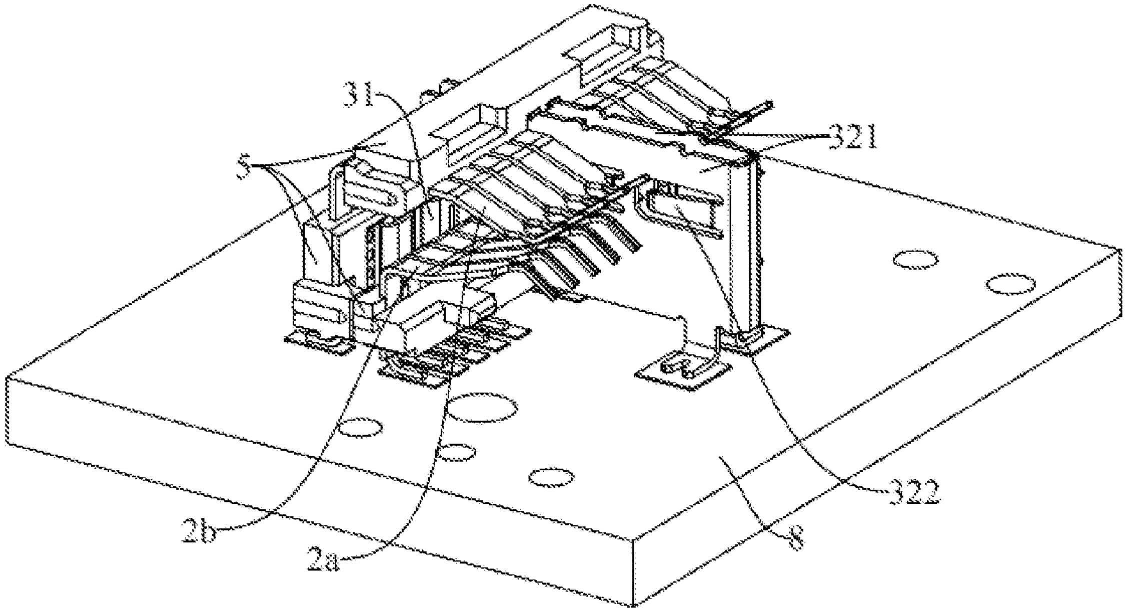
FIG. 4 is a perspective view of an electrical connector with an insulation body removed and from a second viewing angle according to an embodiment of the present disclosure.

Those skilled in the art may dispose and arrange the plurality of terminal groups 2 according to needs. The manner of arranging the terminal groups 2 is not used to limit the present disclosure. In some optional embodiments, as shown in FIG. 3 and FIG. 4, the plurality of terminal groups 2 comprises an upper row of terminal groups 2*a* and a lower row of terminal groups 2*b* with the upper row and the lower row arranged at an interval, and each row of terminal groups 2 are arranged at intervals. A docking interface 4 is formed between each upper row of terminal groups 2*a* and a corresponding lower row of terminal groups 2*b* so that the electrical connector in this embodiment and a connector matching the electrical connector can be plugged with each other, and signals and currents can be transmitted. Further, in some optional embodiments, two terminal groups 2 are disposed in each row so that the electrical connector in this embodiment is compact in structure, practical, and convenient. Of course, the number of terminal groups 2 in each row is not used to limit the present disclosure, and those skilled in the art may set the number of terminal groups 2 in each row according to needs.

In order to facilitate the connection of the terminal groups 2 and the insulation body 1, as shown in FIG. 3 and FIG. 4, the electrical connector in this embodiment further includes a connection body 5 connected to the insulation body 1, and the terminal groups 2 are connected to the connection body 5 separately. In some embodiments, terminals in the terminal groups 2 in each row are fixed to the same connection body 5 so that the terminal groups 2 in each row can be connected to the insulation body 1 at the same time, which is conducive to mounting the terminals. In some optional embodiments, the connection body 5 is integrally formed on the terminal groups 2 in each row by injection molding so that processing is facilitated and assembly efficiency can be improved. Further, when the terminal groups 2 are divided into the upper row of terminal groups 2*a* and the lower row of terminal groups 2*b*, terminals in the upper row of terminal group 2*a* are long. The number of connection bodies 5 may be increased so that the upper row of terminal groups 2*a* can be more stably mounted on the insulation body 1. Optionally, two connection bodies 5 are disposed, the two connection bodies 5 are arranged at an interval on the upper row of terminal groups 2*a*, and the two connection bodies 5 are connected to the insulation body 1 separately.

In order to facilitate the connection of the connection body 5 and the insulation body 1, as shown in FIG. 1, one of the connection body 5 or the insulation body 1 is provided with an engaging protrusion 6, another one of the connection body 5 or the insulation body 1 is provided with an engaging slot 7, and the engaging protrusion 6 and the engaging slot 7 are engaged with each other so that the connection body 5 and the insulation body 1 are connected to each other. Specifically, when two opposite sides of the connection body 5 are each provided with the engaging protrusion 6, the engaging slot 7 is disposed at the position of the insulation body 1 corresponding to the engaging protrusion 6, and the engaging protrusion 6 and the engaging slot 7 are engaged with each other so that the connection body 5 is connected to the insulation body 1. Alternatively, when two opposite sides of the connection body 5 are each provided with the engaging slot 7, the engaging protrusion 6 is disposed at the position of the insulation body 1 corresponding to the engaging slot 7, and the engaging protrusion 6 and the engaging slot 7 are engaged with each other so that the connection body 5 is connected to the insulation body 1.

As shown in FIG. 3, FIG. 4, and FIG. 5, the shielding structure 3 includes a first shielding member 31 disposed between the upper row of terminal groups 2*a* and the lower row of terminal groups 2*b* so that mutual interference between the upper row of terminal groups and the lower row of terminal groups can be reduced, the shielding effect can be improved, and furthermore, a signal transmission rate can be improved. Further, the first shielding member 31 is disposed on the connection body 5. In order to facilitate connection of the first shielding member 31, a protrusion 51 is disposed on the connection body 5 and a positioning hole 311 corresponding to the protrusion 51 is disposed on the first shielding member 31. When the first shielding member 31 and the connection body 5 are connected to each other, the protrusion 51 is inserted into the positioning hole 311 so that the first shielding member 31 is positioned.

In order to further improve the shielding effect, the first shielding member 31 is separately connected to the ground terminals 22 on the two sides of the signal terminal 21. Thus, the signal terminal 21 can be disposed in a semi-enclosed space formed by the first shielding member 31 and the two ground terminals 22, and anti-interference ability of a signal is further improved. In some embodiments, the first shielding member 31 may be connected to the ground terminals 22 by means of laser welding.

As shown in FIG. 3 and FIG. 4, the shielding structure 3 further includes a second shielding member 32 disposed between two adjacent terminal groups 2 in each row. The second shielding member 32 is connected to the insulation body 1. The second shielding member 32 is disposed so that interference between adjacent signal terminals 21 in each row can be reduced, the shielding effect can be improved, and the signal transmission rate can be improved. The second shielding member 32 is disposed so that strength of the insulation body 1 can also be improved and the overall structure of the electrical connector in this embodiment is more stable. In this embodiment, the second shielding member 32 passes through each row of terminal groups 2 so that mounting of the second shielding member 32 is facilitated and structural stability of the electrical connector in this embodiment is further improved.

As shown in FIG. 3 and FIG. 4, when the electrical connector in this embodiment is a header connector, the electrical connector in this embodiment further includes a substrate 8. Two ends of each terminal in the terminal group 2 are a welding portion and a contact portion, respectively. The welding portion is connected to the substrate 8 and the second shielding member 32 is connected to the substrate 8 so that the shielding effect of the electrical connector in this embodiment can be improved.

Further, as shown in FIG. 3 and FIG. 4, the two sides of the second shielding member 32 facing the terminal groups 2 are each provided with a spring contact 322. When the electrical connector in this embodiment is connected to a PCB 100 of a connector mated with the electrical connector, the spring contact 322 is used to abut against the PCB 100 which is plugged with the contact portion of the terminal group 2, and the second shielding member 321 is connected to the PCB 100 and the substrate 8 separately so that the shielding effect can be improved.

Figure 6:
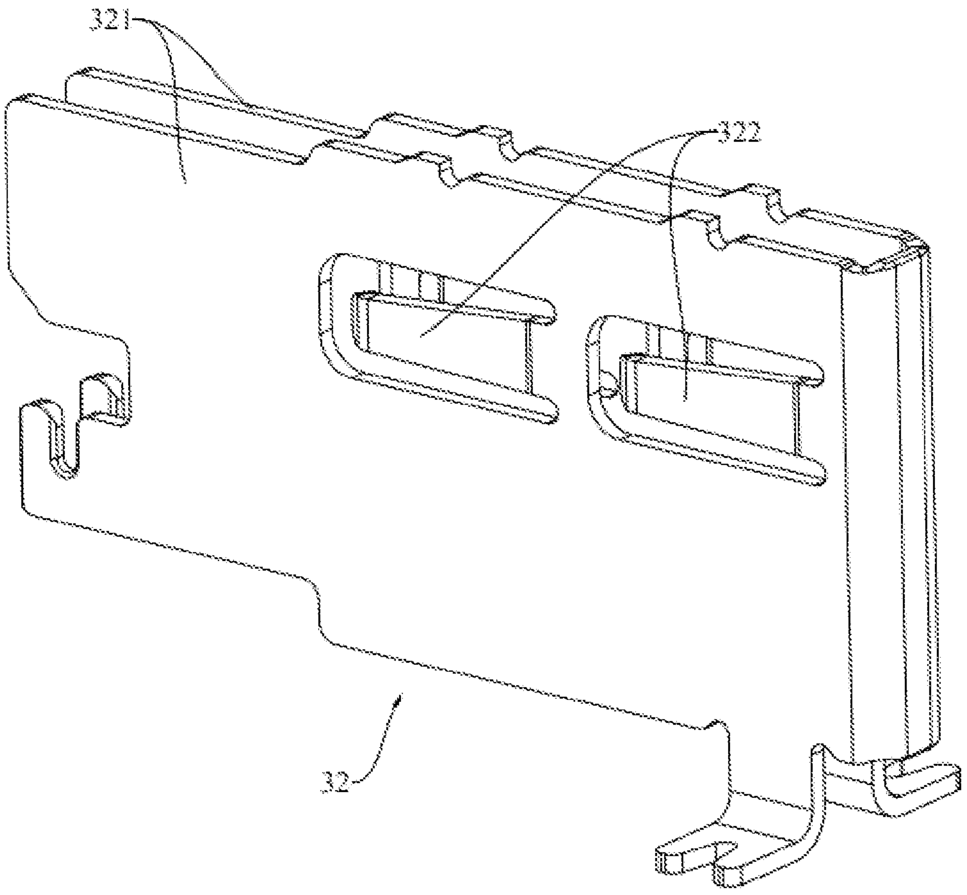
FIG. 6 is a perspective view of a second shielding member according to an embodiment of the present disclosure.

As shown in FIG. 6, the second shielding member 321 includes two shielding sheets 321 arranged at an interval, and each shielding sheet 321 is provided with the spring contact 322 so that the shielding effect is improved and the strength of the insulation body 1 is further improved. In this embodiment, one end of one of the two shielding sheets 321 is connected to one end of the other one of the two shielding sheets 321 so that strength of the second shielding member 32 can be improved and the electrical connector in this embodiment and the connector mated with the electrical connector can be reliably connected.

In this embodiment, the ground terminals 22 are respectively disposed on the two sides of the signal terminal 21 in each terminal group 2 so that the mutual interference between adjacent signal terminals 21 can be reduced and the radio frequency signals can be transmitted. Each terminal group 2 can transmit one set of signals and the plurality of terminal groups 2 may be disposed and arranged according to needs so that the plurality of sets of signals can be transmitted. In addition, the shielding structure 3 includes the first shielding member 31 and the second shielding member 32 so that the adjacent terminal groups 2 are separated from each other, the shielding effect can be further improved, and the electromagnetic interference can be further reduced.

The technical principle of the present disclosure is described above in conjunction with the embodiments. The description is merely used for explaining the principle of the present disclosure and cannot be explained as limitations to the scope of the present disclosure by any means. Based on the explanations herein, other embodiments of the present disclosure conceived by those skilled in the art without creative work fall within the scope of the present disclosure.

What is claimed is:

1. An electrical connector, comprising:

an insulation body;

a plurality of terminal groups which are disposed in rows, wherein each terminal group among the plurality of terminal groups comprises a signal terminal and at least two ground terminals, the signal terminal and the at least two ground terminals are each connected to the insulation body, the signal terminal in the each terminal group is disposed between two ground terminals among the at least two ground terminals in the each terminal group, and the signal terminal in the each terminal group is adjacent to the two ground terminals among the at least two ground terminals in the each terminal group; and a shielding structure, wherein the shielding structure is disposed between two adjacent terminal groups among the plurality of terminal groups;

wherein the shielding structure further comprises a second shielding member, the second shielding member is disposed between two adjacent terminal groups in each row of the plurality of terminal groups, and the second shielding member is connected to the insulation body.

2. The electrical connector according to claim 1, wherein the plurality of terminal groups comprises an upper row of terminal groups and a lower row of terminal groups with the upper row and the lower row arranged at an interval, and each row of the plurality of terminal groups are arranged at intervals.

3. The electrical connector according to claim 2, wherein the shielding structure comprises a first shielding member and the first shielding member is disposed between the upper row of terminal groups and the lower row of terminal groups.

4. The electrical connector according to claim 3, wherein the first shielding member is connected to the two ground terminals on two sides of the signal terminal separately.

5. The electrical connector according to claim 1, further comprising a substrate, wherein two ends of each terminal in the each terminal group are a welding portion and a contact portion respectively, the welding portion is connected to the substrate, and the second shielding member is connected to the substrate.

6. The electrical connector according to claim 1, wherein two sides of the second shielding member facing the two adjacent terminal groups are each provided with a spring contact.

7. The electrical connector according to claim 6, wherein the second shielding member comprises two shielding sheets which are arranged at an interval, and each of the two shielding sheets is provided with the spring contact.

8. The electrical connector according to claim 1, further comprising a connection body, wherein the connection body is connected to the insulation body, and the plurality of terminal groups are connected to the connection body separately.

9. The electrical connector according to claim 8, wherein one of the connection body or the insulation body is provided with an engaging protrusion, another one of the connection body or the insulation body is provided with an engaging slot, and the engaging protrusion and the engaging slot are engaged.

10. The electrical connector according to claim 2, further comprising a connection body, wherein the connection body is connected to the insulation body, and the plurality of terminal groups are connected to the connection body separately.

11. The electrical connector according to claim 3, further comprising a connection body, wherein the connection body is connected to the insulation body, and the plurality of terminal groups are connected to the connection body separately.

12. The electrical connector according to claim 4, further comprising a connection body, wherein the connection body is connected to the insulation body, and the plurality of terminal groups are connected to the connection body separately.

13. The electrical connector according to claim 1, further comprising a connection body, wherein the connection body is connected to the insulation body, and the plurality of terminal groups are connected to the connection body separately.

14. The electrical connector according to claim 5, further comprising a connection body, wherein the connection body is connected to the insulation body, and the plurality of terminal groups are connected to the connection body separately.

15. The electrical connector according to claim 6, further comprising a connection body, wherein the connection body is connected to the insulation body, and the plurality of terminal groups are connected to the connection body separately.

16. The electrical connector according to claim 7, further comprising a connection body, wherein the connection body is connected to the insulation body, and the plurality of terminal groups are connected to the connection body separately.

* * * * *